US006430910B1

(12) United States Patent
Crunkelton

(10) Patent No.: US 6,430,910 B1
(45) Date of Patent: Aug. 13, 2002

(54) FRUIT HARVESTING MACHINE

(76) Inventor: William S Crunkelton, 306 N. Ruth Rd., Avon Park, FL (US) 33825

( * ) Notice: Subject to any disclaimer, the term of this patent is extended or adjusted under 35 U.S.C. 154(b) by 0 days.

(21) Appl. No.: 09/633,973

(22) Filed: Aug. 8, 2000

Related U.S. Application Data

(63) Continuation-in-part of application No. 09/407,500, filed on Sep. 28, 1999, now Pat. No. 6,098,389, which is a continuation-in-part of application No. 08/941,608, filed on Sep. 30, 1997, now Pat. No. 5,966,915.

(51) Int. Cl.$^7$ ............................................. A01D 46/24
(52) U.S. Cl. ...................................................... 56/328.1
(58) Field of Search ............................... 56/328.1, 330, 56/340.1

(56) References Cited

U.S. PATENT DOCUMENTS 3,153,311 A * 10/1964 Pool
3,623,306 A * 11/1971 Reynolds et al.
5,428,947 A * 7/1995 Visser
5,966,915 A * 10/1999 Crunkelton
6,178,730 B1 * 1/2001 Visser

* cited by examiner

Primary Examiner—Robert E. Pezzuto

(57) ABSTRACT

A versatile fruit harvesting machine having the ability to be transformed between an extremely transportable configuration having a reasonable elevational height and an extremely high operational configuration capable of harvesting fruit from the highest regions of fruit trees. The harvesting machine also has the ability to provide for an exceptional range of penetration of the fruit tree during a harvesting cycle to ensure optimum removal of fruit from the tree. Separate regions of picking arms are utilized wherein an upper region of arms is folded down amongst the lower region of arms to provide for the elevation change between a transport configuration and an operational configuration. At least two distinct displacement systems cooperate to provide for the exceptional extension of the array of arms with a first displacement transferring both the array of arms as will as a second displacement system while a further displacement of the array of arms by the second displacement system occurs. Utilization of components of the array of arms displacement system for the upper assembly to act as a guide during the pivotal movement of the arm array of the upper assembly into the arm array of the lower assembly.

17 Claims, 11 Drawing Sheets

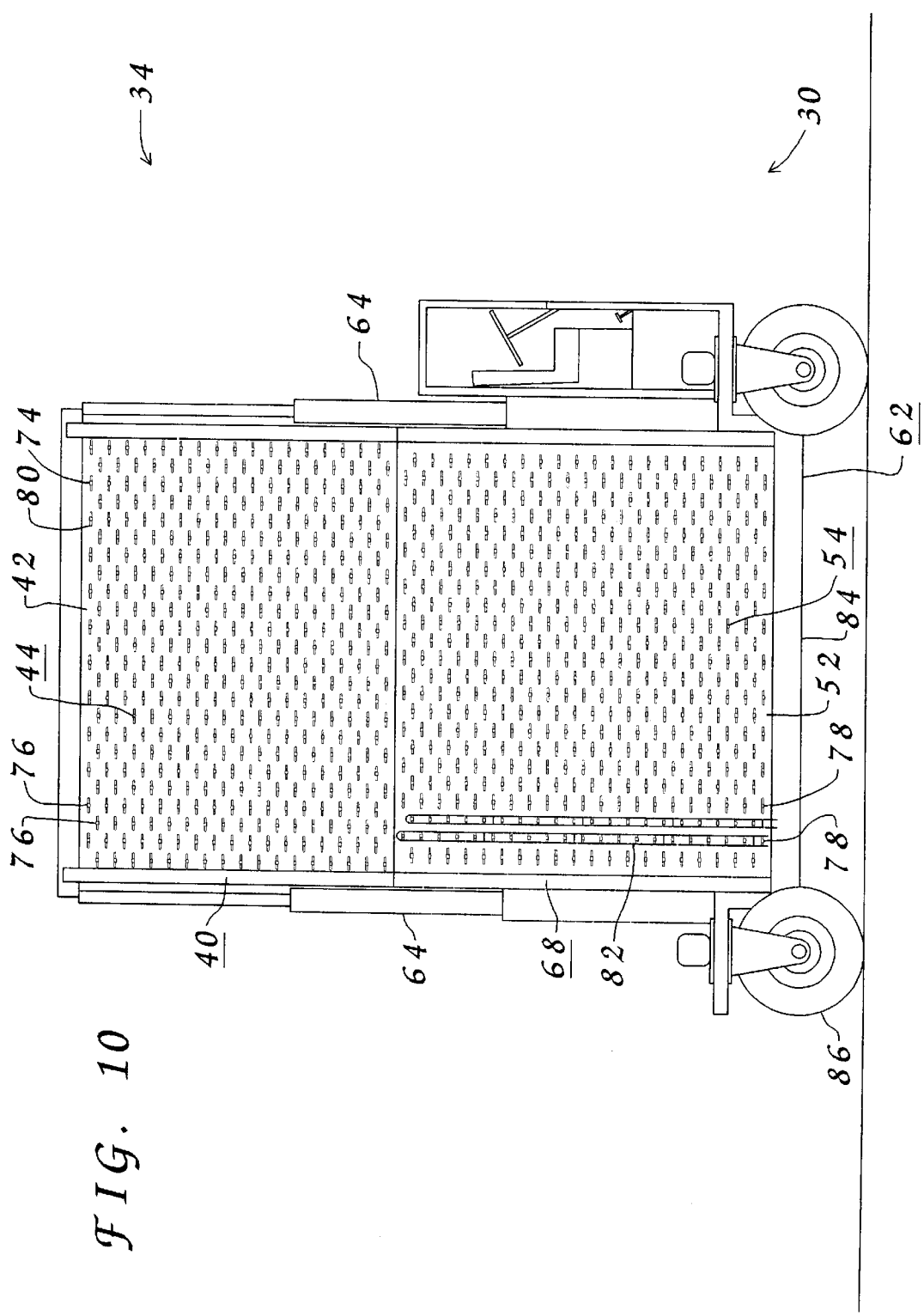

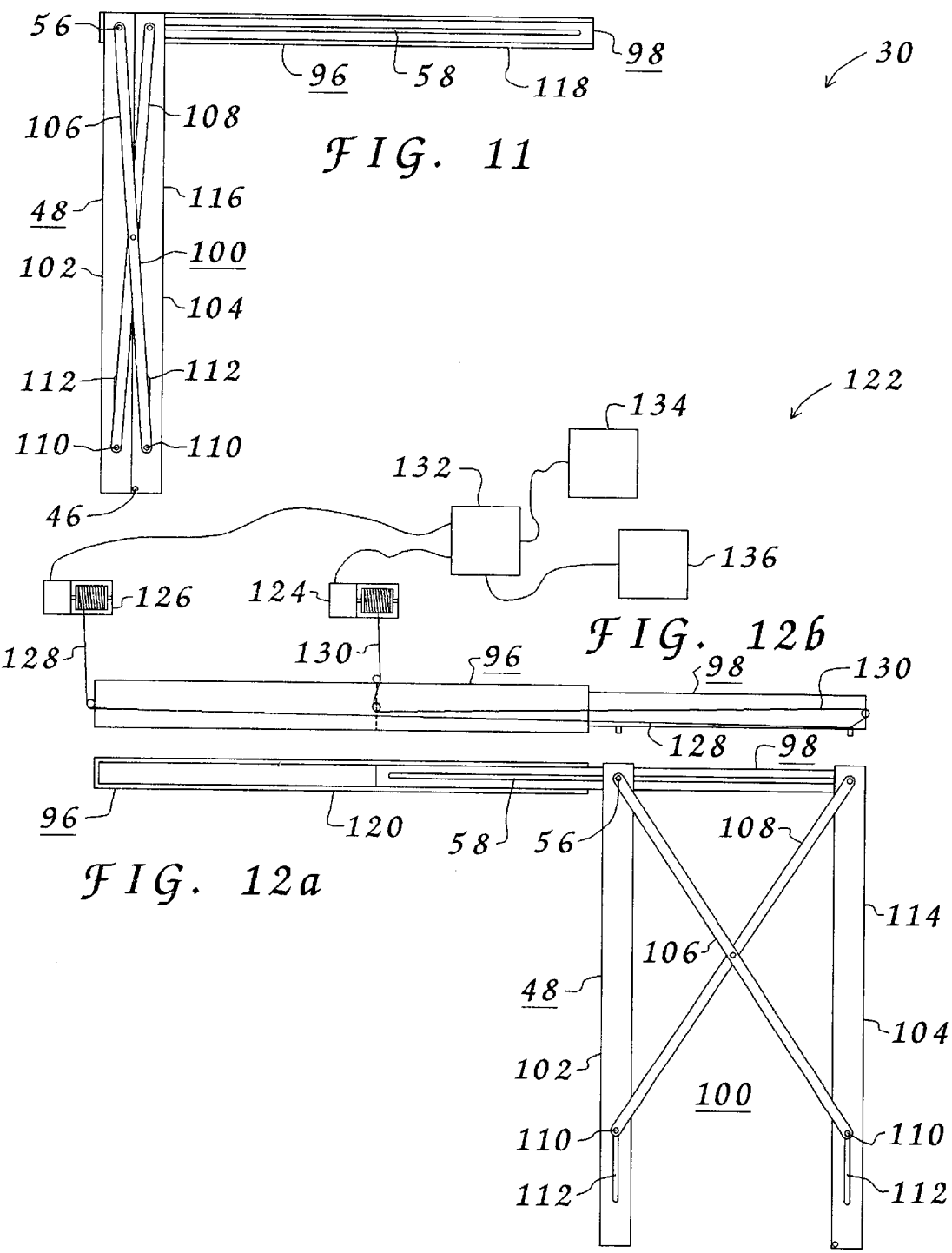

FRUIT HARVESTING MACHINE

CROSS-REFERENCE

This application is a continuation-in-part of Ser. No. 09/407,500 filed Sep. 28, 1999, entitled "Picking Finger Assembly for Fruit Harvesting", now U.S. Pat. No. 6,098,389 which is a continuation-in-part of U.S. Pat. No. 5,966,915, issued Oct. 19, 1999, Ser. No. 08/941,608 filed Sep. 30, 1997, entitled "Fruit Harvesting Machine". These applications are incorporated herein by this reference.

BACKGROUND

1. Field of the Invention

Generally, the invention relates to fruit harvesting machines. More specifically, the invention relates to such machines which utilize a canopy penetration and fruit stem engagement during withdrawal method of harvesting.

2. Description of the Prior Art

Numerous methods exist to harvest the various fruits currently being cultivated. A first group of such methods employ various mechanical devices which provide for a completely mechanical severing of the individual fruit from a tree. A second group of such methods employ various mechanical devices which provide assistance to individual human pickers during a picking procedure to sever the fruit from the tree. This group generally is limited to mechanical devices which may be held by the human picker during the picking procedure. A third method, specific to the type of fruit being harvested, involves the physical picking of the fruit from the tree by individual human pickers without utilization of any mechanical device.

Referring now specifically to citrus fruits, currently the vast majority of such fruit is harvested by being hand picked by people. This harvesting technique has changed little over the years. Pickers grasp individual citrus fruit members and exert a twisting action, a pulling action or a combination of a twisting and pulling action thereon to separate the fruit from the tree. Then, the picker places the severed fruit in a collection bag. This process is repeated until the collection bag has a desired quantity of picked fruit therein. At this point the contents of the collection bag are deposited into a secondary collection container of sufficient dimensions to contain a larger quantity of the picked fruit than that contained by the collection bag. While certain fruit on a tree is accessible while the picker stands on the ground, certain fruit on the tree may only be accessed by elevating the picker above ground level. The most common method of providing such elevation of the picker is by placing a ladder against the tree while the picker ascends the ladder. It is common practice in the industry to apply various chemicals to the tree and/or surrounding ground at various times prior to harvesting the crop. Therefore, chemicals may remain on the tree during the harvesting operation. As can be readily seen, the current method of manual harvesting of citrus fruit is time consuming and exposes the picker to dangerous conditions, including those during the period of time while the picker is elevated above ground level as well as possible exposure to chemicals.

Certain types of fruit are more adapted to such mechanical harvesting than other types of fruit. Reference is now made to machines which harvest fruit under the above identified method where there exists a completely mechanical severing of the fruit from the tree. The art is rich with such machines designed to harvest fruit by severing the fruit from fruit trees. Such machines generally employ one of two severing methods. The first method involves producing a 'shaking action' within the canopy of the tree. This 'shaking action' may involve grasping a portion of the tree and generating the desired 'shaking action' on the entire tree or may involve insertion of one or more members into the canopy wherein the member or members produce the desired 'shaking action' to the canopy without statically engaging, or otherwise grasping, a portion of the tree. The second method involves engaging individual fruit members, or engaging individual connecting stems, and producing a severing action between the individual fruit and the tree.

Without regard to the severing method employed, there exist three strong desires which need to be fulfilled in order for the specific harvesting machine to be commercially accepted within the industry. The first desire is to avoid unnecessary damage to the tree during the harvesting of the fruit attached thereon. This desire relates to actual damage to the tree as well as incidental damage as enameled by removal of immature, or second crop, fruit from certain fruit trees which begin to produce the second crop prior to harvesting of a first mature crop. The second desire is to harvest an extremely high percentage of the mature fruit from each of the trees. The third desire is that the harvesting performed, which satisfies the above two desires, must be economically competitive compared to existing harvesting techniques.

Various deficiencies exist with machines which rely upon the severing action principle. Generally, these machines are referred to as canopy penetration machines which utilize rods with picking members, sometimes referred to as hooks, extending therefrom. Due primarily to the picking members utilized by these machines, these machines also universally have a tendency to damage the tree during harvesting. Additionally, these machines tend to leave an unacceptable quantity of fruit on the tree.

In the prior art we find numerous attempts to provide for a mechanical harvesting of fruit from trees. Several of these attempts have relied upon a 'penetrate and engage' method whereby a probe or arm is inserted into the canopy of the tree where members extending from the probe or arm engage the fruit in close proximity to the stem. Such engagement, following continued movement of the probe or arm, provides for generating a picking pressure between the individual fruit and the tree. Such pressure being preferably produced at, or in close proximity to, a terminal end of the stem where the fruit actually attaches to the tree. While much effort has been expended attempting to create a machine based upon the 'penetrate and engage' method, very little effort has been extended on creating an efficient and productive picking finger assembly which may operate with such machines. Your applicant has spent considerable time and effort in creating, developing and reducing to actual practice both a practical picking finger assembly and a practical harvesting machine which makes use of such picking finger assemblies.

Various attempts have been made to provide a canopy penetration machine capable of harvesting extremely high percentages of fruit from a tree while minimizing damage to the tree. These attempts have been less efficient than desired primarily due to the size requirements of the machines, and associated transport considerations, and the inability to ensure adequate reach, or extension, of the picking arms into the fruit tree. As such, it may be appreciated that there continues to be a need for a canopy penetration mechanical harvesting machine which is relatively small while in a transport configuration for ready movement between work places while having penetration capabilities which ensure ready passage of a central axis of a row of trees during each operational cycle. The present invention provides for canopy penetration machines which substantially fulfill these needs.

SUMMARY

In view of the foregoing disadvantages inherent in the known types of mechanical fruit harvesting machines, your applicant has devised a fruit harvesting machine having various features which may be utilized in various combinations. Ideally the machine will be capable of conversion between a transportable configuration and an operational configuration and capable of deep penetration of the fruit tree wherein an arm housing is capable of being deployed well beyond a perimeter of the transport assembly or chassis of the fruit harvesting machine. The fruit harvesting machine is capable of being moved about during operation by being towed or, more preferably, by utilizing self contained propulsion. The fruit harvesting machine has a plurality of arms contained in a lower array of arms and in an upper array of arms with each arm having at least one picking finger extending therefrom. Each picking finger provides for an engagement of fruit to produce a picking pressure to harvest the fruit. The lower array of arms are contained by a lower arm housing member which is displaceably mounted on the transport assembly for lateral penetration of the fruit tree. The upper array of arms are contained by an upper arm housing member which is also displaceably mounted on the transport assembly for lateral penetration of the fruit tree while in an operation orientation. The upper arm housing member, with the upper array of arms contained thereby, additionally is displaceable between the operational orientation, where the arms are retained relatively horizontal to the transport assembly, and a transport orientation, where the arms are retained relatively vertical to the transport assembly and where the arms intermix with the arms of the lower array of arms of the lower arm housing member. The upper arm housing member is alternatingly displaced between the operational orientation and the transport orientation utilizing any of several powering arrangements. The lower arm housing member and the upper arm housing member, while in the operational orientation, are displaceable between a respective fully retracted orientation and a fully extended orientation for penetration of the fruit trees. The displacement of at least the upper arm housing member utilized a dual stage displacement to provide for exceptional extension well beyond the perimeter of the transport assembly. A first displacement arrangement moves the upper arm housing member between the fully retracted orientation and an intermediate orientation while a second displacement arrangement moves the upper arm housing member between the intermediate orientation and the fully extended orientation. These displacement arrangements may occur sequentially, simultaneously, or may have an overlapping of occurrences.

My invention resides not in any one of these features per se, but rather in the particular combinations of them herein disclosed and it is distinguished from the prior art in these particular combinations of these structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore a primary object of the present invention to provide for a canopy penetration mechanical fruit harvesting machine which may be readily converted to a small size for transport under it's own power, towed or transported on a flat bed trailer.

Other objects include;
a) to provide for the above defined conversion for transport by splitting the arm housing into a lower set and an upper set and providing for the upper set to pivot down into the lower set to reduce the height of the harvesting machine.
b) to provide for a track member which remains level while moving upward and downward relative to the harvesting machine and which slidably engages a portion of the upper arm housing member to guide the upper arm housing member during a pivotal movement of the upper arm housing member between an operational orientation and a transport orientation.
c) to provide for utilization of a track of a track system primarily employed for extension and retraction of the upper arm housing member relative to the fruit tree for guidance of the pivotal movement of the upper arm housing member between the operational orientation and the transport orientation.
d) to provide for a staggering of columns of arms of the upper arm housing member relative to columns of arms of the lower arm housing member wherein the columns of arms of the upper arm housing member pass between the columns of arms of the lower arm housing member.
e) to provide for an extra column of arms on the upper arm housing member in cooperation with the staggering of the columns of the upper to the lower arm housing member.
f) to provide for sleeves to cover each column of the lower arm housing member wherein the arms of the upper arm housing member may readily move therebetween during transfer between the operational orientation and the transport orientation.
g) to provide for a canopy penetration mechanical fruit harvesting machine capable of extension of a rearward most portion of an arm housing member well beyond the perimeter of the chassis of the harvesting machine wherein adequate penetration of the fruit trees is ensured.
h) to provide for a dual track system to provide for the desired extension beyond the perimeter of the chassis of the harvesting machine wherein a first set of tracks slide within a second set of tracks while the arm housing slides within the second set of tracks.
i) to provide for an expansion of a scissor like assembly along a track of a track system to provide for stability of the arm housing member.
j) to provide for a displacement of the expanded scissor like assembly along the track member to provide for a partial displacement of the arm housing member.
k) to provide for a displacement of the track having the expanded and displaced scissor like assembly contained therein along another track system to provide for a partial displacement of the arm housing member.

l) to provide for a cable system to control displacement of the various components including the track members and the components slidable mounted within the track members.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein;

FIG. 10 is a side elevational view of the harvesting machine in the orientation depicted in FIG. 3 and FIG. 8.

FIG. 11 is a rear elevational view of a portion of a displacement assembly in the fully retracted orientation.

FIG. 12a is a rear elevational view of the assembly depicted in FIG. 11 in the fully extended orientation.

FIG. 12b is an overhead plan view of a portion of the assembly depicted in FIG. 12a including a cable system and means to control the displacement.

DESCRIPTION

Figure 13:
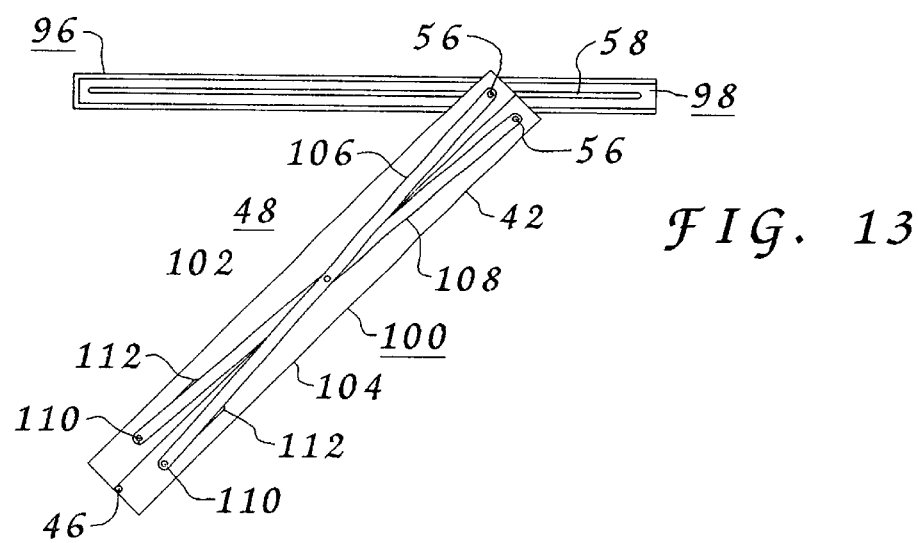
FIG. 13 is a rear elevational view of the assembly depicted in FIG. 11 during transfer between the operational orientation and the transport orientation.

Reference is hereafter made to the drawings where like reference numerals refer to like parts throughout the various views.

Configuration Transfer Between Operation and Transport

It is a strong desire to provide for a harvesting machine which may be readily transported while not in service harvesting fruit. This requires that the harvesting machine not exceed certain height limits imposed by various jurisdictions. When it is required to transport the harvesting machine on a separate carrier, wherein the harvesting machine rides on the separate carrier, the height of the separate carrier must be considered. It is also a strong desire to provide for a harvesting machine which may harvest fruit from all portions of the fruit trees. This requires that the harvesting machine have an imposing height during a harvesting operation. These conflicting desires may be met by providing transfer means to displace an upper extent of the harvesting machine between an elevated placement and a lowered placement. Numerous methods are known in the art to provide for the desired elevational displacement and many of these methods are applicable to the present invention.

Figure 6:
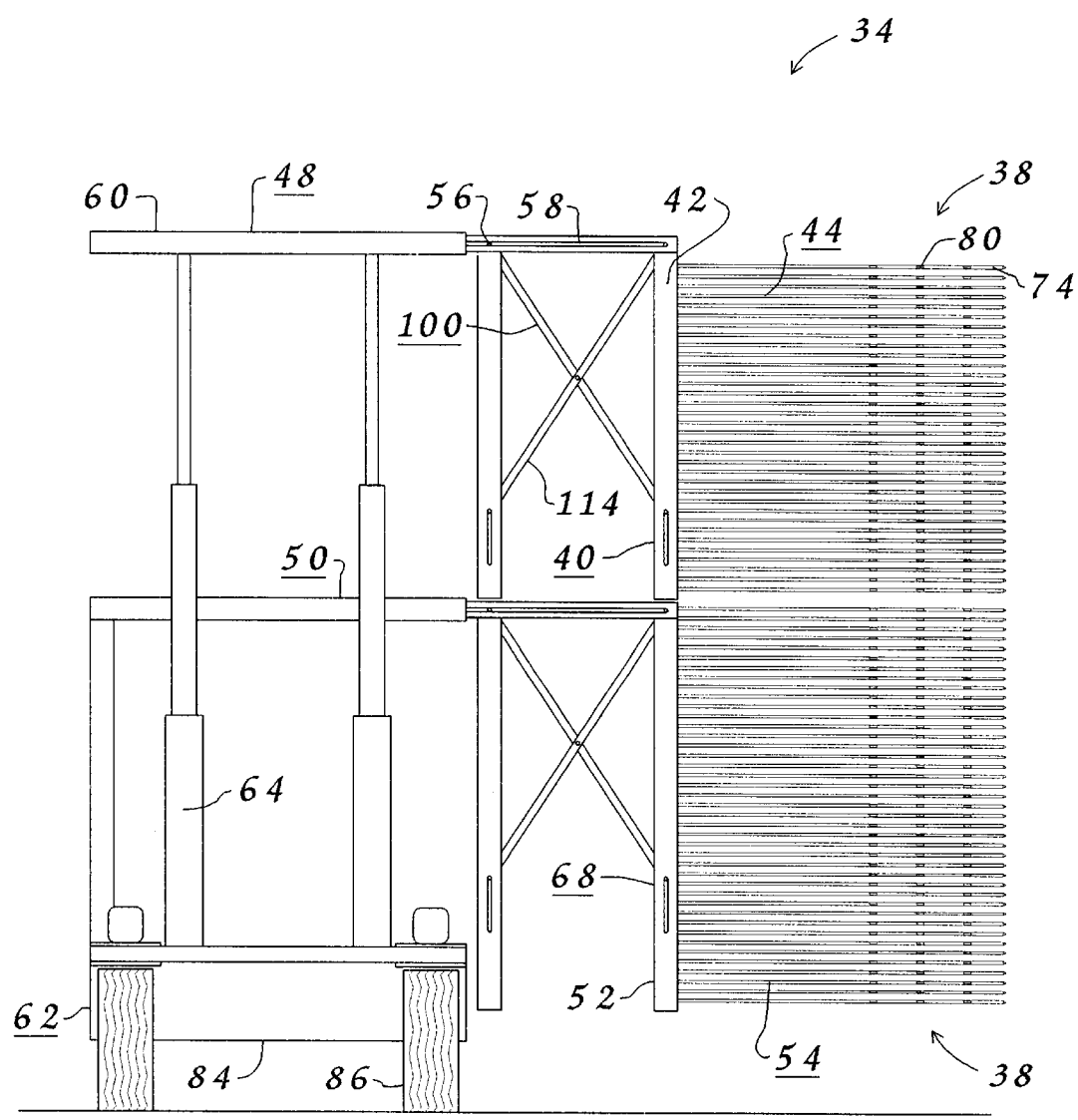
FIG. 6 is a rear elevational view of the harvesting machine in the fully extended orientation.
Figure 7:
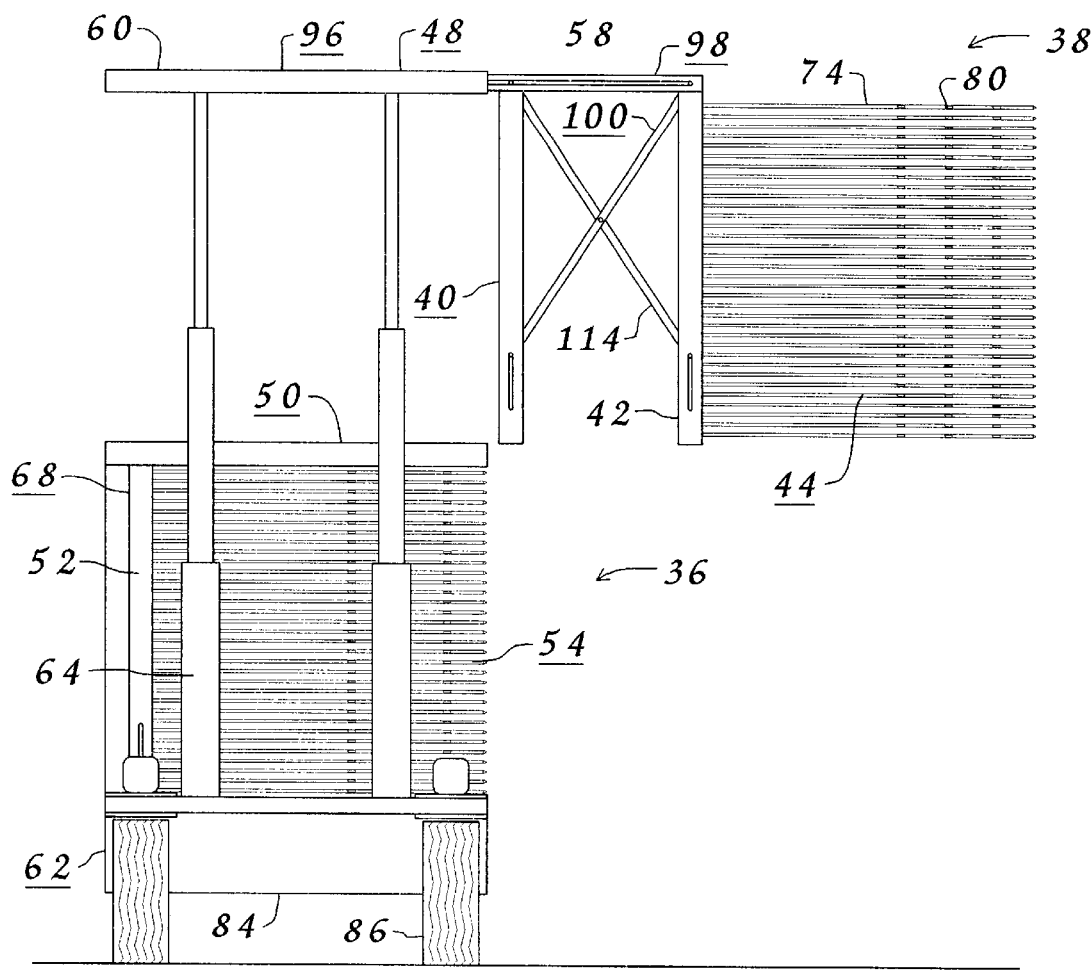
FIG. 7 is a rear elevational view of the harvesting machine with an upper array of arms in the fully extended orientation and with a lower array of arms in the fully retracted orientation.
Figure 8:
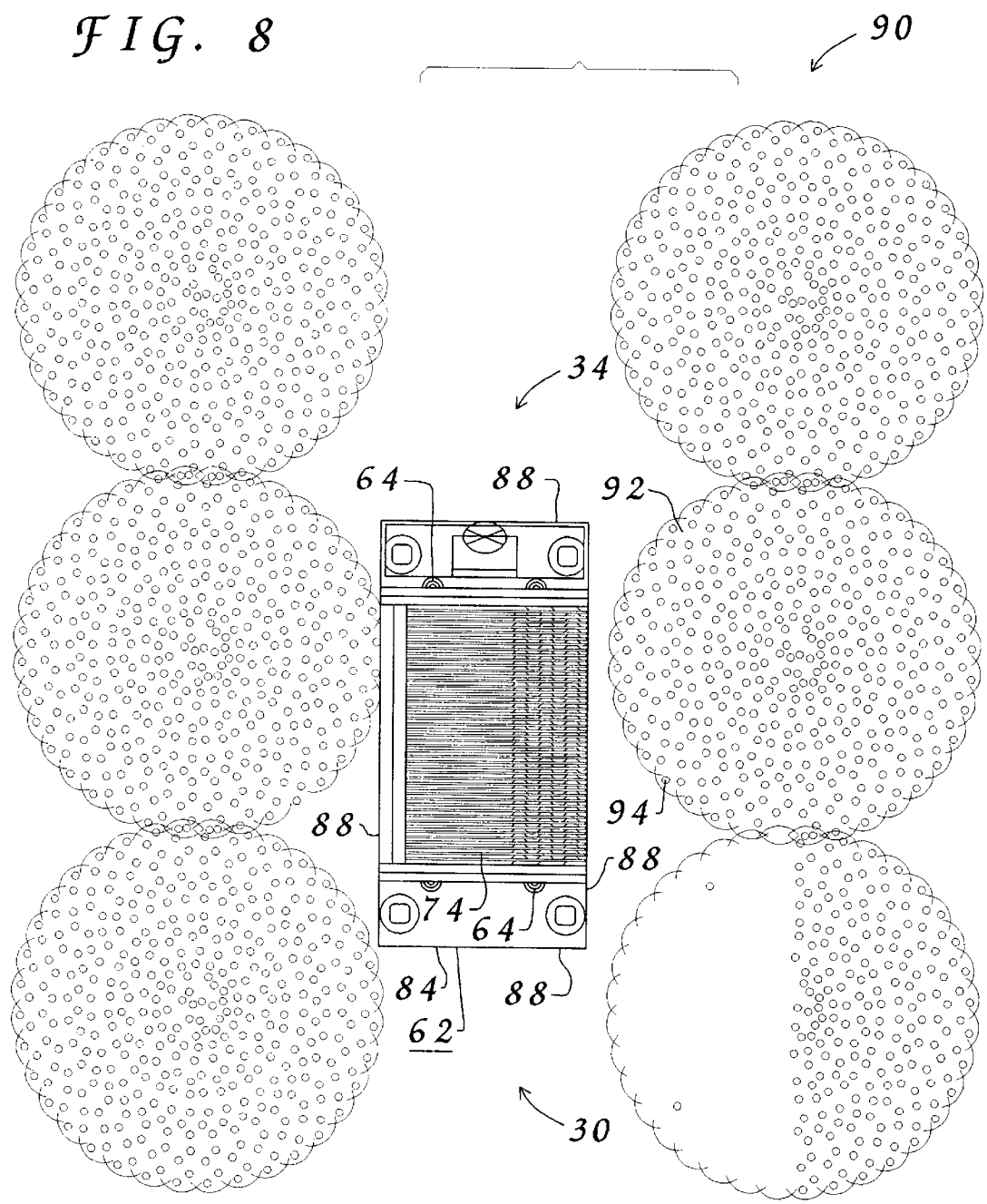
FIG. 8 is an overhead plan view of the harvesting machine in the orientation depicted in FIG. 3 positioned in a fruit grove.

A harvesting machine 30, or portions thereof, is depicted in the various views. Harvesting machine 30 has various orientations including a transport orientation 32, shown in FIG. 1 and an operational orientation 34, shown in FIG. 3 through FIG. 8 and FIG. 10. While in operational orientation 34 harvesting machine 30 further has a fully retracted orientation 36, see FIG. 3, and a fully extended orientation 38, see FIG. 6 and any desired position therebetween.

Figure 2:
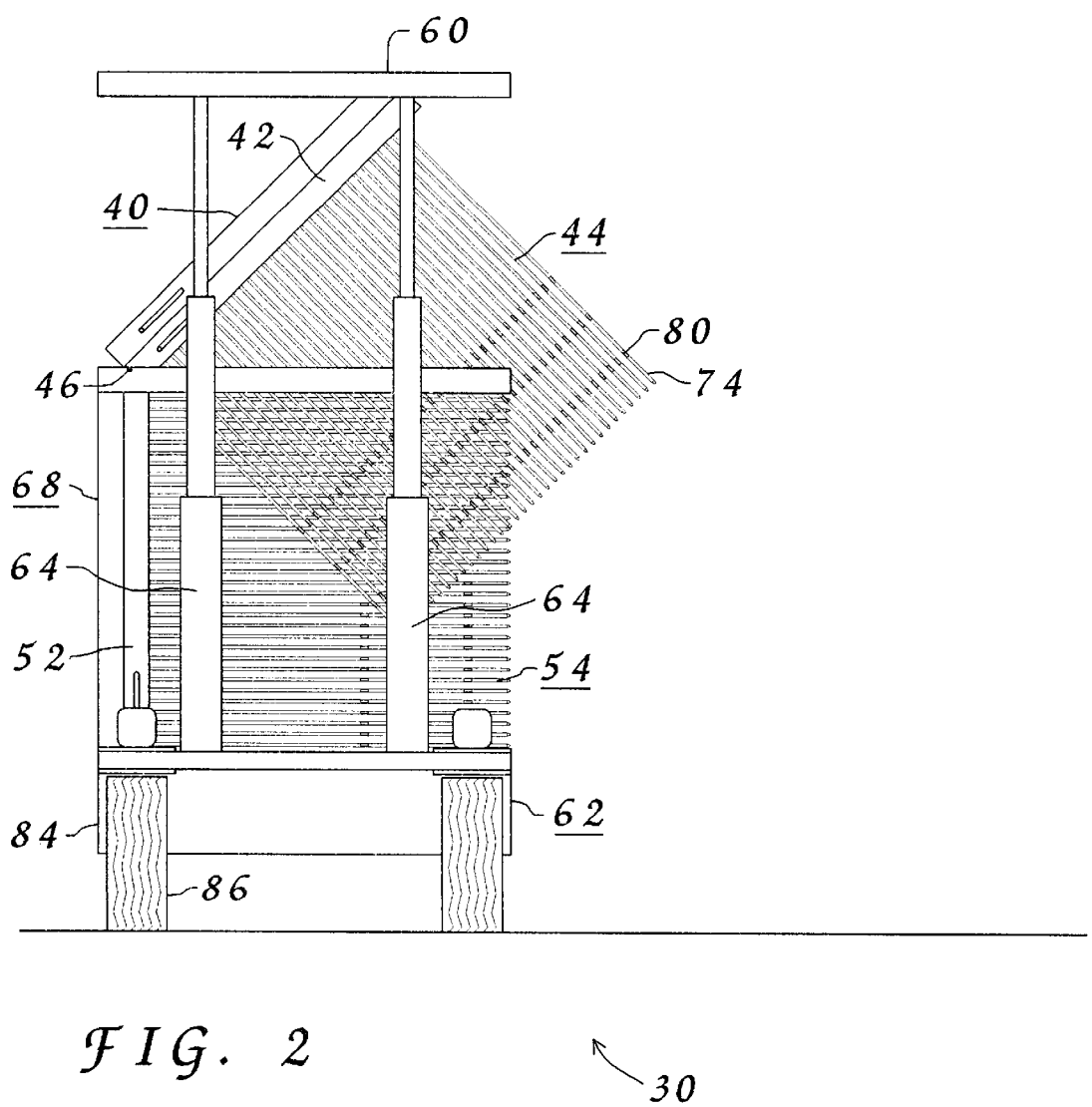
FIG. 2 is a rear elevational view of the harvesting machine during transfer between the transport orientation and an operational orientation.

In a preferred embodiment an upper assembly 40, which has an upper arm housing member 42 which retains an upper array of arms 44, is pivotally displaced utilizing several structural components utilized for the displacement of upper arm housing member 42 between fully retracted orientation 36 and fully extended orientation 38. Opposing sets of these components will be positioned in spaced relationship relative to upper array of arms 44 and preferably outside of upper array of arms 44. As depicted in FIG. 2 and FIG. 13 a pivot member 46 engages a portion of a displacement assembly 48 of upper arm housing member 42. Pivot member 46 then temporarily engages a portion of a displacement assembly 50 of a lower arm housing member 52. This arrangement provides for a pivotal displacement of upper arm housing member 42 relative to lower arm housing member 52 wherein upper array of arms 44 folds into a lower array of arms 54.

Figure 1:
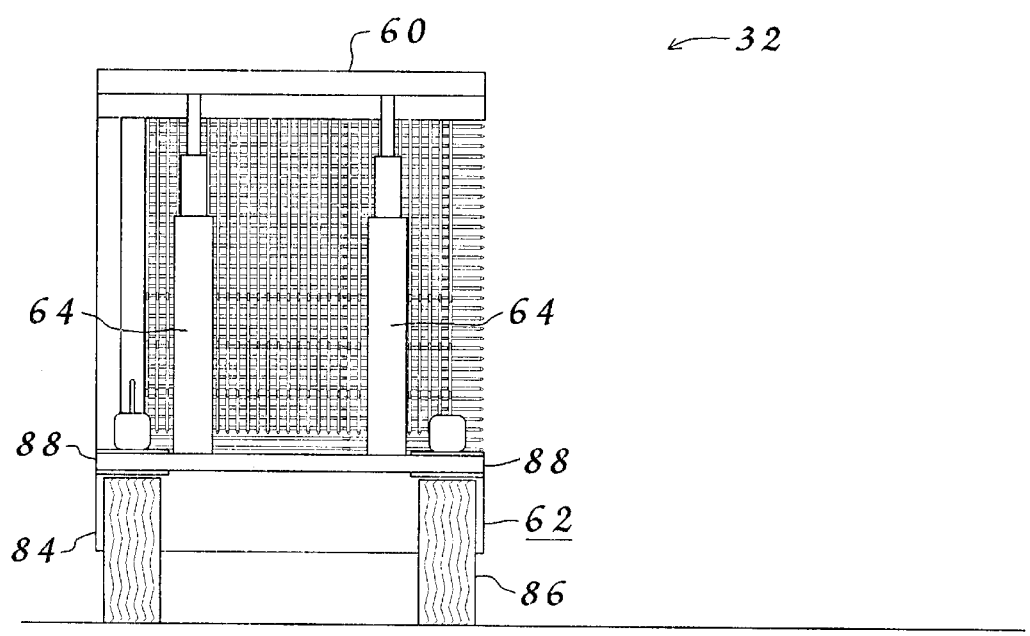
FIG. 1 is a rear elevational view of a harvesting machine in a transport orientation.
Figure 3:
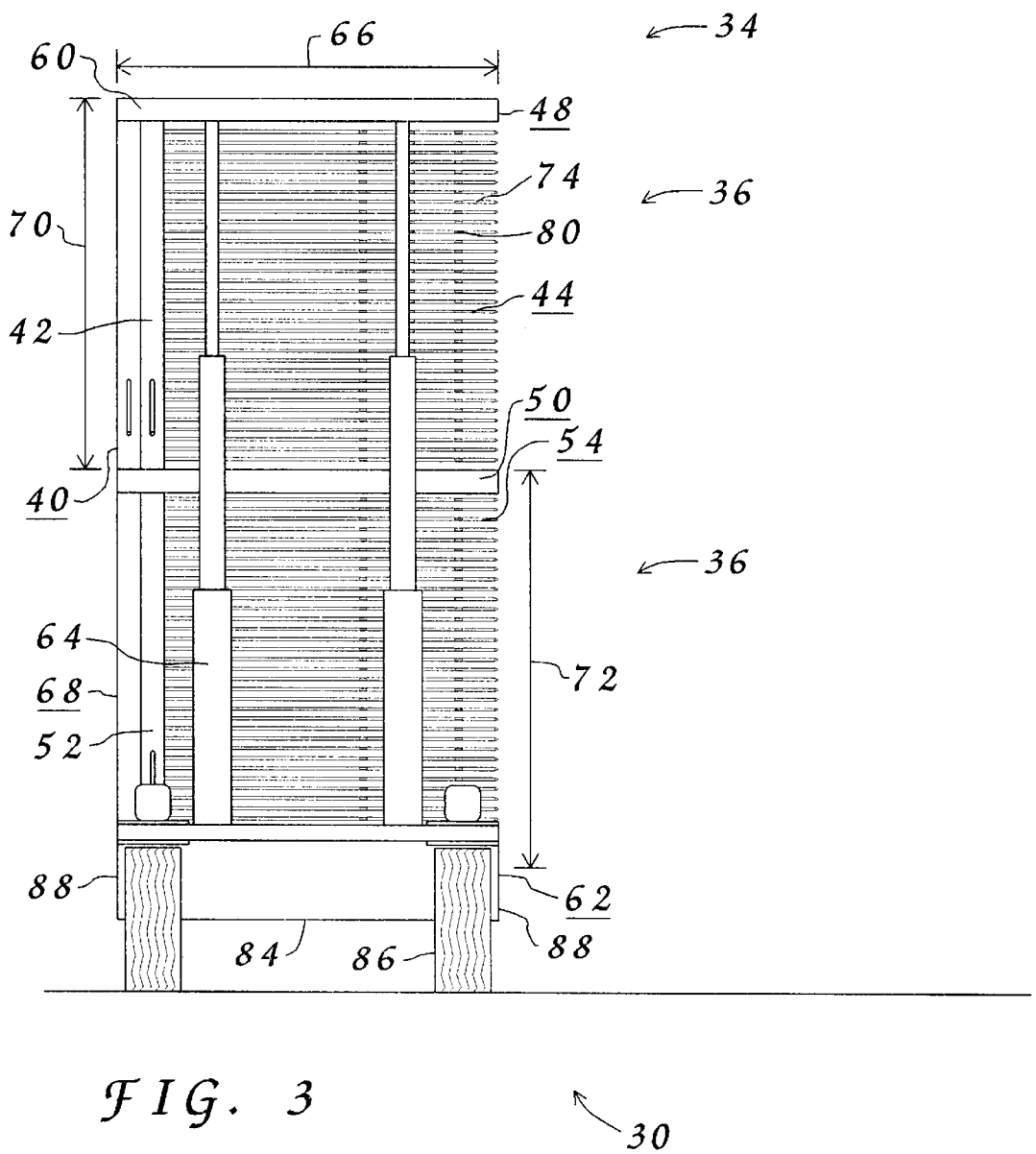
FIG. 3 is a rear elevational view of the harvesting machine in the operational orientation and in a fully retracted orientation.
Figure 4:
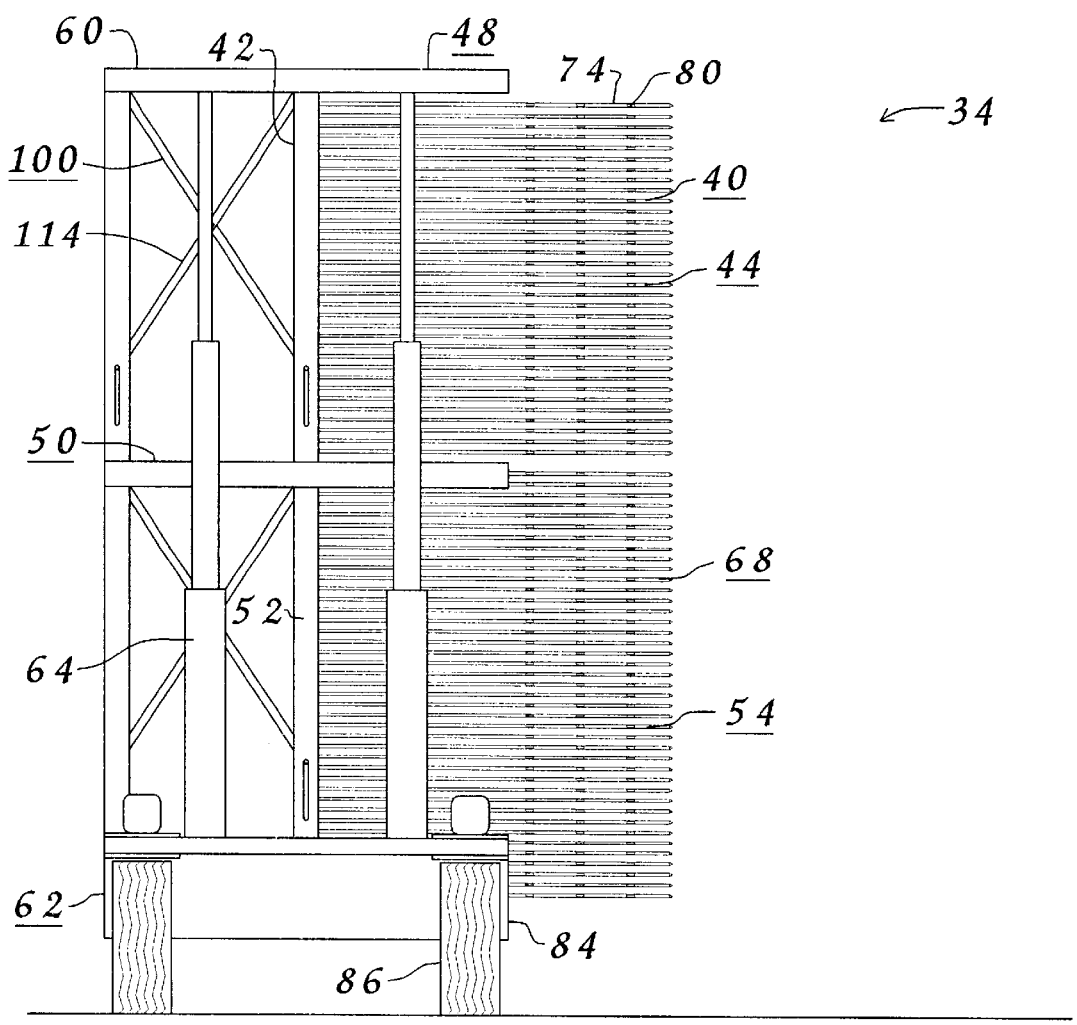
FIG. 4 is a rear elevational view of the harvesting machine during transfer between the fully retracted orientation and the fully extended orientation.
Figure 5:
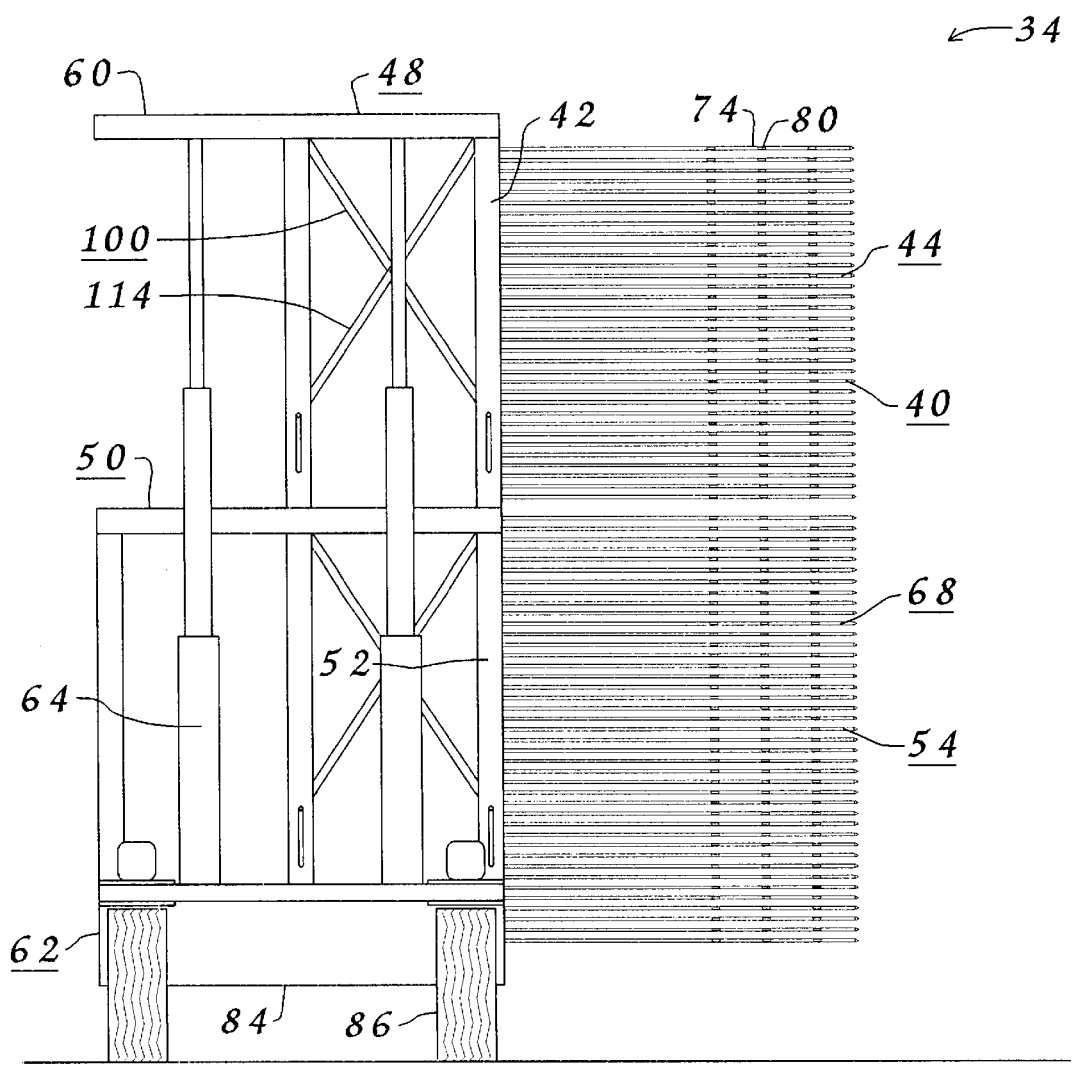
FIG. 5 is a rear elevational view of the harvesting machine during transfer between the fully retracted orientation and the fully extended orientation.

This pivotal displacement is guided by travel of a guide member 56 within a guide slot 58 during elevational displacement of an upper control assembly 60, specifically see FIG. 1 through FIG. 3. Various elevational displacement means may be employed to provide for the desired elevational displacement of upper control assembly 60 relative to a transport assembly 62 of harvesting machine 30. Hydraulic drives 64 are depicted performing this elevational displacement between FIG. 1 and FIG. 3. If required additional structures may be provided for structural integrity of upper arm housing member 42 and/or upper control assembly 60 while in operational orientation 34.

The dimensional configurations of the various components are important in order to provide for maximization of the various sizes while in operational orientation 34 and to provide for minimization of the various sizes while in transport orientation 32. Referring now to FIG. 3 transport assembly 62 will have a width 66 which ideally will be uniform for both a lower assembly 68 and upper assembly 40. Upper assembly 40 will have a height 70 while lower assembly 68 will have a height 72. In order to ensure the desired mating while in transport orientation 32, see FIG. 1, height 70 must be no greater, and preferable slightly less depending upon placement of the pivot point, than width 66.

Additionally, width 66 of upper assembly 40 must allow for placement relative to lower assembly 68. While upper array of arms 44 may extend below lower array of arms 54 while in transport orientation 32, preferably width 66 of upper assembly 40 will be no greater than height 72.

Figure 9:
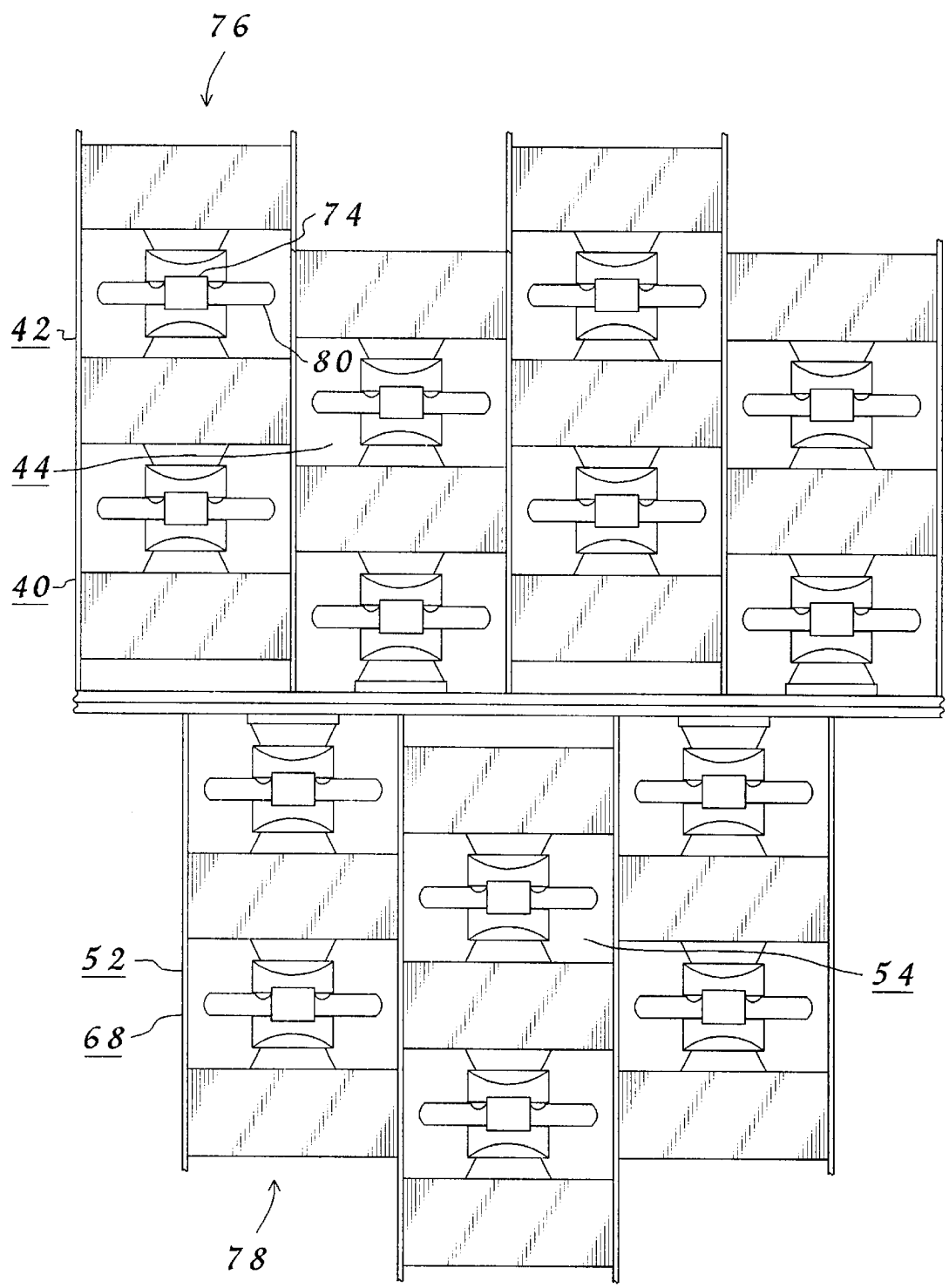
FIG. 9 is a side elevational view of a portion of a lower arm housing member and a portion of an upper arm housing member.

It is necessary to provide for a interweaving of arms 74 of upper array of arms 44 with arms 74 of lower array of arms 54 while not in operational orientation 34. This is accomplished by providing for an offsetting of each column of arms of the two (2) arrays 44 and 54 at least while not actually performing a harvesting operation. This may be accomplished by providing for a shifting of upper array of arms 44 relative to lower array of arms 54 or a shifting of lower array of arms 54 relative to upper array of arms 44. Preferably, this involves construction wherein the desired offset fixedly exists. FIG. 9 and FIG. 10 depict upper array of arms 44 having one (1) extra upper column 76 of arms 74 relative to the number of lower columns 78 of arms 74 of lower array of arms 54 and the desired offset between each upper column 76 and each adjacent lower column 78.

As an aid to displacement, and to prevent any harmful engagement of interacting picking fingers 80 during the transfer, sleeves 82, see FIG. 10, are placed over each lower column 78 prior to commencement of the transfer process from operational orientation 34 to transport orientation 32 and removed after transfer back to operational orientation 34. Sleeves 82 also act to guide each arm 74 of upper array of arms 44 into proper placement relative to lower array of arms 54.

Dual Displacement

It is a requirement to provide for a harvesting machine which has arm members which may be displaced into and out of a canopy of a fruit tree in an alternating displacement. It is a strong desire to provide for maximum penetration capabilities wherein a rearward extent of an arm housing member containing the arms is displaced well beyond a perimeter of the frame of the harvesting machine. Ideally, a dual displacement system provides for this extraordinary extension capability wherein means for a first displacement arrangement provides for displacement of the arm housing thereon while means for a second displacement arrangement provides for displacement of at least a portion of the structures utilized for the first displacement arrangement. Numerous methods are known in the art to provide for the desired dual displacement and many of these methods are applicable to the present invention.

Harvesting machine 30 comprises transport assembly 62 which comprises a frame 84 and wheels 86 sufficient to allow harvesting machine 30 to move about freely during operation using any transport means conventionally known in the art. Transport assembly 62 has a perimeter 88, see FIG. 8, which defines the outer extents of harvesting machine 30 while all arms 74 are in fully retracted orientation 36.

Displaceably positioned on transport assembly 62 is lower array of arms 54 contained in lower arm housing member 52, specifically see FIG. 9. Also displaceably positioned on transport assembly 62, and above lower array of arms 54 while in operational orientation 34, is upper array of arms 44 contained in upper arm housing member 42, specifically see FIG. 9.

Each array of arms 54 and 44 comprises a plurality of arms 74 having at least one (1) picking finger 80 extending therefrom. In operation, see FIG. 8, harvesting machine 30 moves about a fruit grove 90 while repetitively displacing arms 74 into and out of trees 92. During the retraction from the tree movement picking fingers 80 provide for an engagement of fruit 94 in close proximity to the stem connecting fruit 94 to trees 92. During continued retraction of the respective arm 74 a picking pressure is produced to cause a severing of fruit 94 from tree 92.

In the embodiment depicted both upper assembly 40 and lower assembly 68 are displaceable utilizing nearly identical structures. Therefore, a detailed description is only provided for displacement of upper assembly 40 which is also applicable to displacement of lower assembly 68.

Referring now to FIG. 3 through FIG. 7 and FIG. 11 through FIG. 13, opposing sets of displacement assembly 48, or portions thereof, are depicted. FIG. 3 through FIG. 7 show the displacement assembly 48 shown on the left hand side of FIG. 10 looking toward the machine from the left while FIG. 11 through FIG. 13 show a portion of displacement assembly 48 shown on the right hand side of FIG. 10 looking outward also from the left.

Each displacement assembly 48 comprises a first track system 96, a second track system 98 and a scissor assembly 100. First track system 96 is fixedly positioned relative to upper control assembly 60. Slidably positioned relative to first track system 96 is second track system 98 which may be selectively displaced along first track system 96. Second track system 98 has guide slot 58 positioned therealong to slidably receive two (2) guide members 56 of displacement assembly 48.

Scissor assembly 100 further comprises a first coupling assembly 102 and a second coupling assembly 104 which are linked together by a first linking member 106 and a second linking member 108. Second coupling assembly 104 in turn connects to, or is part of, upper arm housing member 42. Lower guide members 110 of scissor assembly 100 engage slots 112 for controlled displacement therein. This arrangement provides for scissor assembly 100 to remain perpendicular to guide slot 58 and particularly when in an extended placement 114.

Scissor assembly 100 provides stability to upper arm housing member 42 while scissor assembly 100 is in extended placement 114, see FIG. 4 through FIG. 7 and FIG. 12a. It being noted that scissor assembly 100 is free hanging from second track system 98 without similar support at lower extents, see FIG. 7. If desired such lower support may be provided. Scissor assembly 100 slides within second track system 98 during expansion and contraction of scissor assembly 100. Additionally, scissor assembly 100 is displaceable within guide slot 58 of second track system 98 while in either extended placement 114 or in a retracted placement 116, see FIG. 11.

If desired first coupling assembly 102 may consist of a single connection member positioned relative to guide slot 58 wherein three points are utilized for the desired displacement while providing for the desired positioning of second coupling assembly 104 and therefore upper array of arms 44.

Second track system 98 is at least partially displaceable along first track system 96 between a retracted placement 118, see FIG. 11, and an extended placement 120, see FIG. 12a. This displacement is independent of positioning of scissor assembly 100 within guide slot 58 of second track system 98.

When it is desired to displace upper arm housing member 42 relative to transport assembly 62 control may occur to provide whatever measurement of extension which is desired anywhere between fully retracted orientation 36 and fully extended orientation 38. Additionally, it is possible, and desirable due to the configurations of specific trees, to provide for distinct measurements of extension between the extension of lower array of arms 54 and the extension of upper array of arms 44.

Several different sequences may be employed during displacement of displacement assembly 48. Ideally, during an extension period of upper arm housing member 42, and therefore upper array of arms 44, scissor assembly 100 is transferred from retracted placement 116 to extended placement 114 while fully retracted relative to second track system 98. Following this extension scissor assembly 100 is displaced along second track system 98. Following this displacement second track system 98 is displaced relative to first track system 96 from retracted placement 118 to extended placement 120. This sequence of events provides for greater stability of displacement assembly 48 during operation. Similarly, during the withdrawal period it is preferred to first displace second track system 98 from extended placement 120 to retracted placement 118 within first track system 96. Following this retraction scissor assembly 100 is transferred from extended placement 114 to retracted placement 116 relative to second track system 98. Following this retraction scissor assembly 100 is transferred from extended placement 114 to retracted placement 116. This sequence of events similarly provides for greater stability of displacement assembly 48 during operation.

Of course during any extension or retraction operation it is necessary to provide for at least some control over the opposing sets of displacement assemblies 48 which control upper array of arms 44 to maintain a synchronized operation. Similar, but independent if desired, control must be made of displacement assemblies 50 which control lower array of arms 54. Depending upon the configuration of the various components and the power source utilized many different control means, as conventionally known in the art, may be utilized to provide this control.

A particularly expedient power source for the desired operation of displacement assembly 48 involves a cable system 122, see FIG. 12b. While configurations exist which allow for use of a single reversible cable system to operate the desired displacement cycles, a particularly expedient method involves use of an extension cable drive 124 and a retraction cable drive 126 for the two directions of displacement. Various tension means may be employed to provide for a biasing of various components toward certain orientations wherein a desired sequence of events occur during operation.

During the extension period retraction cable drive 126 is idled wherein a retraction cable 128 is fed from retraction cable drive 126. During the extension period extension cable drive 124 pulls an extension cable 130 along a path of pulleys. Extension cable 130 anchors to a forward portion of scissor assembly 100 wherein when operated scissor assembly 100 expands then advances along second track system 98. Once scissor assembly 100 is expanded and fully displaced relative to second track system 98 further retraction of extension cable 130 results in displacement of second track system 98 along first track system 96 up to fully extended orientation 38.

During the retraction period extension cable drive 124 is idled wherein extension cable 130 is fed from extension cable drive 124. During the retraction period retraction cable drive 126 pulls retraction cable 128 along a path of pulleys. Retraction cable 128 anchors to a forward portion of scissor assembly 100 wherein when operated second track system 98 is retracted along first track system 96. Once second track system 98 is fully retracted relative to first track system 96 further retraction of retraction cable 128 results in displacement of scissor assembly 100 along second track system 98. Following the displacement of scissor assembly 100 along second track system 98 continued retraction of retraction cable 128 results in a closure of scissor assembly 100 up to fully retracted orientation 36.

It is desirable to provide for automation of the harvesting operation utilizing harvesting machine 30. Ideally, the operator would only be required to steer harvesting machine 30 along the row of trees. As depicted in FIG. 12b a control device 132 would receive input from a measuring device 134 which would determine travel of harvesting machine 30 as exampled by coupling to wheel 86. Based upon a predefined spacing of cycles of operation along the row of trees control device 132 would advance harvesting machine 30 the desired distance by exerting control over a transmission 136 of harvesting machine 30. Based upon this advance control device 132 would exert control over extension cable drive 124 and retraction cable drive 126 to provide for the desired extension and withdrawal of upper array of arms 44 in any definable distance between fully retracted orientation 36 and fully extended orientation 38. Typically, only one cycle of extension and retraction will occur at each placement location of harvesting machine 30 but, if desired, control device may direct that subsequent cycles occur.

While not depicted in any of the various views due to not being relevant to the present invention, preferably a catcher—transfer assembly will be installed on harvesting machine 30 to provide for ready capture and transfer of harvested fruit prior to contact with the ground.

With respect to the above description then, it is to be realized that the optimum dimensional relationships for the parts of the invention, to include variations in size, material, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:
1. A fruit harvesting machine comprising:
   a) a transport assembly having a perimeter;
   b) transport means to provide for motion of the transport assembly;
   c) a plurality of picking fingers, each picking finger to provide for an engagement of a fruit to produce a picking pressure;
   d) a plurality of arms, each arm having at least one of the picking fingers extending therefrom;
   e) a lower arm housing member displaceably mounted on the transport assembly, the lower arm housing member having a lower array of arms;
   f) an upper arm housing member displaceably mounted on the transport assembly, the upper arm housing member having an upper array of arms, the upper arm housing member having:
      1) an operational orientation wherein each of the arms of the upper array of arms are retained relatively horizontal to the transport assembly and elevationally above the lower array of arms of the lower arm housing member;
      2) a transport orientation wherein each of the arms of the upper array of arms are retained relatively vertical to the transport assembly and intermixed with the arms of the lower array of arms of the lower arm housing member;

g) transfer means to provide for an alternating displacement of the upper arm housing member between the operational orientation and the transport orientation;

h) displacement means to provide for a displacement of the lower arm housing member and the upper arm housing member relative to the transport assembly and alternatingly between a respective fully retracted orientation and a respective fully extended orientation, the displacement means of at least the upper arm housing member further comprising:

1) first displacement means to provide for an alternating displacement of at least the upper arm housing member relative to the transport assembly less than the distance between the respective fully retracted orientation and the respective fully extended orientation, the alternating displacement of the first displacement means having an extension direction and a withdrawal direction;

2) second displacement means to provide for an alternating displacement of at least the upper arm housing member relative to the transport assembly less than the distance between the respective fully retracted orientation and the respective fully extended orientation, the alternating displacement of the second displacement means having an extension direction and a withdrawal direction;

and wherein the displacement of the first displacement means and the displacement of the second displacement means cooperate to provide for displacement of at least the upper arm housing member between the respective fully retracted orientation and the respective fully extended orientation with the upper arm housing member significantly outside of the perimeter of the transport assembly while in the respective fully extended orientation.

2. The fruit harvesting machine defined in claim 1 wherein the second displacement means of the displacement means further comprises a first track system and wherein the first displacement means of the displacement means further comprises:

a) a second track system slidably mounted relative to the first track system;

b) a scissor extension member comprising a first coupling assembly and a second coupling assembly, the first coupling assembly and the second coupling assembly mounted relative to the second track system in a spaced relationship, the first coupling assembly and the second coupling assembly each comprising:

1) a first connection member slidably engaging the second track system;

2) a second connection member slidably engaging the second track system and positioned to connect the upper arm housing member to the second track system;

3) a third connection member situated on the upper arm housing member in spaced relationship to the second connection member;

4) a first linking member having a first end and a second end, the first end in communication with the first connection member, the second end in communication with the third connection member;

5) a second linking member having an end in communication with the second connection member;

6) a sliding member to provide for a movement of the second linking member;

7) linking means to provide for a pivotal connection of the first linking member and the second linking member wherein the linking members and the linking means provide for a cooperation between the first connection member, the second connection member, the third connection member and the sliding member, the cooperation to provide for displacement of the upper arm housing member relative to the second track system;

c) scissor operation means to provide for an operation of the scissor extension member wherein the upper arm housing member is displaced along the second track system;

d) scissor displacement means to provide for displacement of the extended scissor extension member along the second track system;

and wherein the second displacement means further comprises a displacement of the second track system relative to the first track system while the scissor extension member is extended and displaced relative to the second track system.

3. The fruit harvesting machine defined in claim 2 wherein the first track system and the second track system further comprises an upper track system positioned elevationally near an upper extent of the upper array of arms while the upper arm housing member is in the operational orientation and wherein the transfer means further provides for the upper track system to move on the transport assembly while remaining substantially horizontal while the upper arm housing is guided in a pivotal arc by the second track system of the upper track system while moving between the operational orientation and the transport orientation.

4. The fruit harvesting machine defined in claim 1 wherein the displacement means further comprises a cable system to provide for:

a) a motion of the upper arm housing member relative to the second track system;

b) a motion of the second track system relative to the first track system.

5. The fruit harvesting machine defined in claim 1 further comprising:

a) measuring means to provide for a measurement of an advance of the fruit harvesting machine during motion of the transport assembly;

b) control means to provide for receiving input from the measuring means and instituting mechanical actions;

b) extension activation means controlled by the control means to provide for the displacement of the lower arm housing member and the upper arm housing member from a position at least close to the fully retracted orientation to a position at least close to the fully extended orientation;

c) retraction activation means controlled by the control means to provide for the displacement of the lower arm housing member and the upper arm housing member subsequent to the displacement of the extension activation means from the position at least close to the fully extended orientation to the position at least close to the fully retracted orientation;

d) advance means to provide for the motion of the transport assembly a measurement of distance as determined by the measuring means subsequent to the displacements of the extension activation means and the retraction activation means.

6. A fruit harvesting machine comprising:
a) a transport assembly having a perimeter;
b) transport means to provide for motion of the transport assembly;
c) a plurality of picking fingers, each picking finger to provide for an engagement of a fruit to produce a picking pressure;
d) a plurality of arms, each arm having at least one of the picking fingers extending therefrom;
e) an arm housing member displaceably mounted on the transport assembly, the arm housing member having an array of arms;
f) displacement means to provide for a displacement of the arm housing member relative to the transport assembly and alternatingly between a fully retracted orientation and a fully extended orientation, the displacement means further comprising:
 1) first displacement means to provide for an alternating displacement of the arm housing member relative to the transport assembly less than the distance between the fully retracted orientation and the fully extended orientation, the alternating displacement of the first displacement means having an extension direction and a withdrawal direction;
 2) second displacement means to provide for an alternating displacement of the arm housing member relative to the transport assembly less than the distance between the respective fully retracted orientation and the respective fully extended orientation, the alternating displacement of the second displacement means having an extension direction and a withdrawal direction, wherein the displacement of the first displacement means and the displacement of the second displacement means cooperate to provide for displacement of the arm housing member between the fully retracted orientation and the fully extended orientation with the arm housing member significantly outside of the perimeter of the transport assembly while in the fully extended orientation.

7. The fruit harvesting machine defined in claim 6 wherein the second displacement means of the displacement means further comprises a first track system and wherein the first displacement means of the displacement means further comprises:
a) a second track system slidably mounted relative to the first track system;
b) a scissor extension member comprising a first coupling assembly and a second coupling assembly, the first coupling assembly and the second coupling assembly mounted relative to the second track system in a spaced relationship, the first coupling assembly and the second coupling assembly each comprising:
 1) a first connection member slidably engaging the second track system;
 2) a second connection member slidably engaging the second track system and positioned to connect the upper arm housing member to the second track system;
 3) a third connection member situated on the upper arm housing member in spaced relationship to the second connection member;
 4) a first linking member having a first end and a second end, the first end in communication with the first connection member, the second end in communication with the third connection member;
 5) a second linking member having an end in communication with the second connection member;
 6) a sliding member to provide for a movement of the second linking member;
 7) linking means to provide for a pivotal connection of the first linking member and the second linking member wherein the linking members and the linking means provide for a cooperation between the first connection member, the second connection member, the third connection member and the sliding member, the cooperation to provide for displacement of the upper arm housing member relative to the second track system;
c) scissor operation means to provide for an operation of the scissor extension member wherein the arm housing member is displaced along the second track system;
d) scissor displacement means to provide for displacement of the extended scissor extension member along the second track system;
and wherein the second displacement means further comprises a displacement of the second track system relative to the first track system while the scissor extension member is extended and displaced relative to the second track system.

8. The fruit harvesting machine defined in claim 6 wherein the second displacement means of the displacement means further comprises a first track system and wherein the first displacement means of the displacement means further comprises a second track system slidably mounted relative to the first track system.

9. The fruit harvesting machine defined in claim 8 wherein the displacement means further comprises a cable system to provide for:
a) a motion of the upper arm housing member relative to the second track system;
b) a motion of the second track system relative to the first track system.

10. A fruit harvesting machine comprising:
a) a transport assembly;
b) transport means to provide for motion of the transport assembly;
c) a plurality of picking fingers, each picking finger to provide for an engagement of a fruit to produce a picking pressure;
d) a plurality of arms, each arm having at least one of the picking fingers extending therefrom;
e) a lower arm housing member displaceably mounted on the transport assembly, the lower arm housing member having a lower array of arms;
f) an upper arm housing member displaceably mounted relative to the lower arm housing member, the upper arm housing member having an upper array of arms, the upper arm housing member having an operational orientation wherein each of the arms of the upper array of arms are retained relatively horizontal to the transport assembly, the upper arm housing member having a transport orientation wherein each of the arms of the upper array of arms are retained relatively vertical to the transport assembly;
g) transfer means to provide for an alternating displacement of the upper arm housing member between the operational orientation and the transport orientation;
h) displacement means to provide for a displacement of the arm housing member relative to the transport assembly and alternatingly between a retracted orientation and an extended orientation, the displacement generally aligned with the longitudinal length of the arms, the displacement having an extension direction and a withdrawal direction, the engagement of the select fruit tree by the picking fingers occurring during the withdrawal period.

11. The fruit harvesting machine defined in claim 10 wherein the displacement means further comprises:

a) a track system elevationally displaceably mounted near an upper extent of the upper array of arms while the upper arm housing member is in the operational orientation relative to the transport assembly;

b) and wherein the transfer means further provides for the track system to move vertically on the transport assembly while remaining substantially horizontal while the upper arm housing is guided in a pivotal arc by the track system while moving between the operational orientation and the transport orientation.

12. The fruit harvesting machine defined in claim 10 wherein transfer means further comprises a pivotal connection of the upper arm housing member to the transport assembly at an axis line in close proximity to a lower extent of the upper arm housing member wherein the upper arm housing member pivots over to fold down wherein the arms of the upper arm housing member interleave with the arms of the lower arm housing member while in the transport orientation.

13. The fruit harvesting machine defined in claim 10 wherein the upper array of arms further comprises a series of spaced columns of arms with an opening between each adjacent column of arms and wherein the lower array of arms further comprises a series of spaced columns of arms with an opening between each adjacent column of arms and wherein the openings of the lower array of arms align vertically with the columns of arms of the upper array of arms during the alternating displacement of the transfer means of the upper arm housing member between the operational orientation and the transport orientation.

14. The fruit harvesting machine defined in claim 13 further comprising a plurality of sleeves, each sleeve to provide for covering a respective column of arms of the lower array of arms during the displacement of the upper arm housing member between the operational orientation and the transport orientation wherein the picking fingers of the lower array of arms are protected from an engagement with the picking fingers of the upper array of arms during the displacement.

15. The fruit harvesting machine defined in claim 10 wherein the arms of the lower array of arms have a measurement of length from a terminal end of the arm to a closest point on the lower arm housing member and wherein the upper arm housing member has a measurement of length from a lowest extent while in the operational orientation to a highest extent while in the operational orientation and wherein the measurement of length of the arm of the lower array of arms is greater than the measurement of length of the upper arm housing member.

16. The fruit harvesting machine defined in claim 10 wherein the displacement means further comprises a first track system and a second track system, the second track system slidably mounted relative to the first track system and wherein the transfer means to provide for the displacement of the upper arm housing member between the operational orientation and the transport orientation utilizes the second track system to guide the upper arm housing member during a pivotal movement between the operational orientation and the transport orientation.

17. The fruit harvesting machine defined in claim 10 wherein the lower array of arms of the lower arm housing member has a count of a number of columns of arms and wherein the upper array of arms of the upper arm housing member has a count of a number of columns of arms and wherein the count of the number of columns of arms of the upper array of arms is one greater than the count of the number of columns of arms of the lower array of arms.

\* \* \* \* \*